Figures 1, 2:
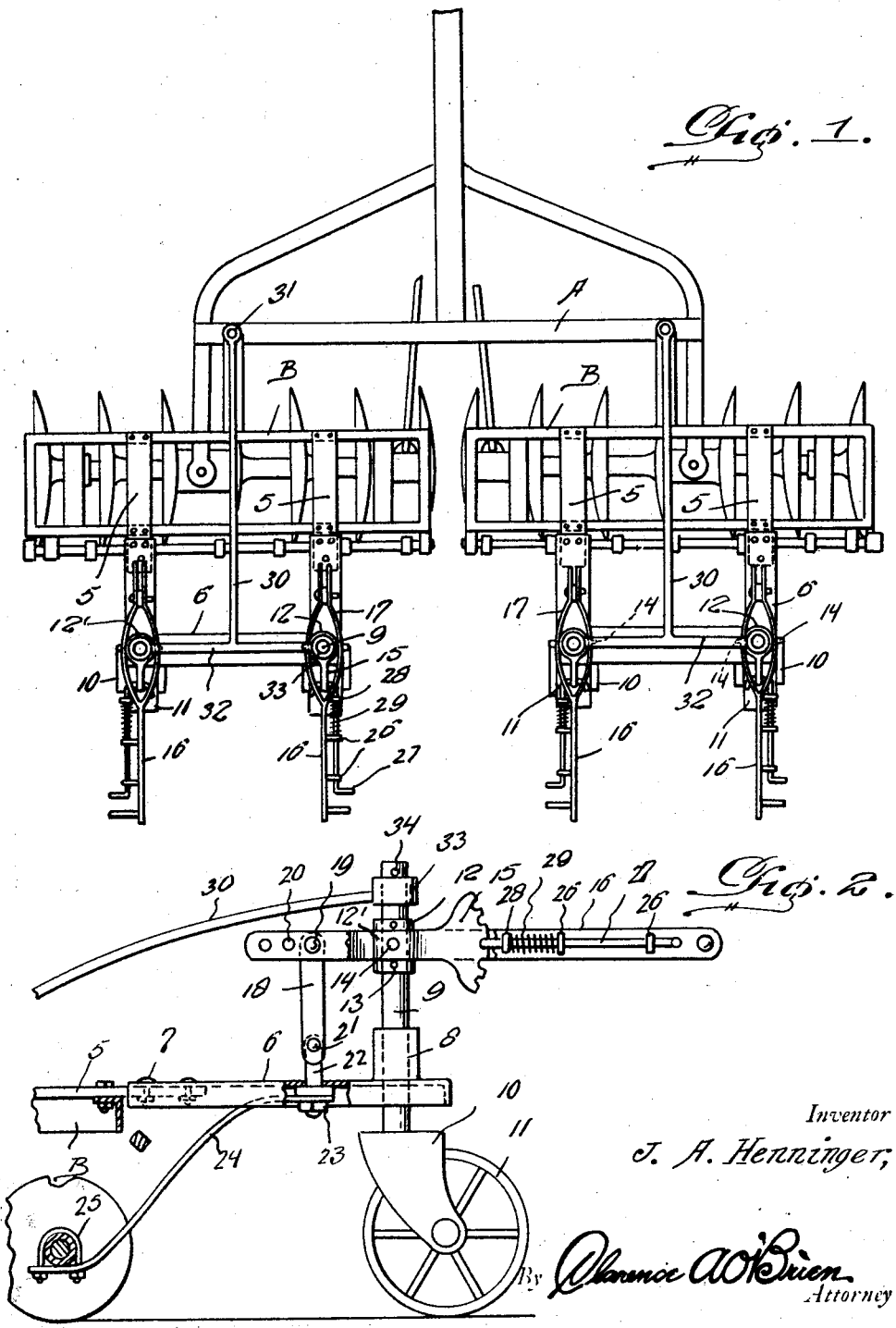

March 27, 1928.

J. A. HENNINGER 1,664,075

ATTACHMENT FOR DISK HARROWS

Filed March 15, 1927

Inventor

J. A. Henninger,

By Clarence A. O'Brien
Attorney

Patented Mar. 27, 1928.

1,664,075

UNITED STATES PATENT OFFICE.

JAMES A. HENNINGER, OF ROUNDUP, MONTANA.

ATTACHMENT FOR DISK HARROWS.

Application filed March 15, 1927. Serial No. 175,497.

The present invention relates to attachments for disk harrows of the type wherein the disks are arranged in gangs, and the prime object of the invention is to provide in the attachment means for regulating the depth of the disks in the ground and the angles of said disks in relation to the ground.

Another important object of the invention lies in the provision of attachments of this nature which may be incorporated in the structure of conventional disk harrows of the gang type without necessitating any changes in the structure of the harrow.

A still further very important object of the invention lies in the provision of an attachment which is simple in its construction, efficient and reliable in use, easy to manipulate, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view of a conventional harrow showing my attachment associated therewith, and Figure 2 is a side elevation of one of the attachments showing portions in section for clearness.

Referring to the drawing in detail it will be seen that the letter A denotes generally the draft frame of the harrow of the two gang type. The two gangs of disk harrows are mounted in the usual well known manner below the gang frames B, each of which is provided at its rear with the bar C for supporting the usual disk scrapers.

All the parts thus far described are conventional and have been illustrated in the accompanying drawing merely to bring out clearly the utility and advantages of my attachment.

There are two attachments for each harrow of the two gang type, that is there is one attachment for each gang. These attachments are identical in construction, and therefore, only one will be described in detail.

Referring to one of the attachments in detail, it will be seen that a pair of cross bars 5 are attached to the gang frame B to extend slightly rearwardly thereof. An attachment frame 6 is of substantially U-shape in formation and has its extremities bolted or otherwise fixed as at 7 to the rear ends of the cross bars 5 so as to extend in a plane parallel to the plane of the frame B. In the corners, that is at the junctures of the bight with the legs of the frame 6 there are formed bearings 8 for slidably receiving standards 9, the lower ends of which are formed with yokes 10 in which are journaled wheels 11. Collars 12 are fixed in any suitable manner as at 13 to the standards 9 a slight distance below the upper ends thereof and above the frame 6, and in spaced relation to each other. Pins 14 extend from a sleeve 12' disposed between collars 12. The sleeve 12' is formed with a rearwardly extending notch sector 15. Levers 16 have their forward ends bifurcated. These bifurcations are bowed as at 17 to extend around the sleeve 12' and have openings intermediate their ends pierced by the pins 14. The forward ends of these bifurcations extend in spaced parallelism to receive therebetween links 18 by means of bolts or pins 19 which pierce openings 20 in the forward extremities of the bifurcations of the levers. There are a plurality of these openings 20 in each lever so that the location of the links may be changed to vary the leverage as may be desired. These links 18 depend downwardly, and are pivotally engaged as at 21 with bolts 22 extending through openings in the legs of the frame 6. Nuts 23 are engaged on the lower ends of the bolts 22 and hold in place brace rods 24 which are engaged by U bolts 25 on the hub of one of the disks. On each lever 16 there are mounted lugs 26 through which are slidable the shank of an elongated pawl 27 which is provided with a stop adjacent its engaging end so that a coil spring 29 may be disposed thereabout to impinge against the forward lug 26 and the stop 28 for normally holding the forward end of the pawl engaged in one of the notches of the notched sector 15. A brace rod 30 is attached to the frame A as at 31 in any suitable manner and has a cross rod 32 at its rear end, the extremities of which terminate in sleeves 33 for receiving the upper ends of standards 9. Pins 34 pierce transverse openings in the upper extremities of the standards 9 above the sleeves 30.

It is thought that the construction of the attachments will now be clearly understood without a more detailed description thereof. It will be apparent that by rocking the levers 16 the frames 6 may be lowered or raised, thereby controlling the digging depths of the disks of the gangs. It will also be apparent that the levers of one attachment may be rocked differently so as to change the angularity of the frame B associated therewith in respect to the ground. It will be further apparent that the levers after having been adjusted as desired may be locked in their adjusted positions by the pawl and notched sectors.

The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described the invention, what I claim as new and desire to secure by Letters Patent is:—

1. In an attachment for gang disk harrows and the like comprising a U-shaped frame having bearings in the corners thereof, standards slidable through the bearings, wheels, means for journaling the wheels on the lower ends of the standards, sleeves fixed to the standards above the frame, trunnions projecting from the sleeves, levers pivoted on the trunnions, notched segments projecting from the sleeves, spring pressed pawls on the levers, engageable with the notched segments, and links pivotally engaged with the levers and the frame.

2. An attachment for gang disk harrows and the like comprising a U-shaped frame, means for attaching the extremities of the frame to the frame of a gang of disks so that the U-shaped frame extends in a plane substantially parallel to the frame of the gang of disks, said U-shaped frame having bearings in the corners thereof, standards slidable through the bearings, wheels, means for journaling the wheels on the lower ends of the standards, sleeves fixed to the standards above the U-shaped frame, trunnions projecting from the sleeve, levers pivoted on the trunnions, notched segments projecting from the sleeve, spring pressed pawls on the lever engageable with the notched segments, links pivotally engaged on the levers engageable with the notched segments, links pivotally engaged with the levers and the U-shaped frame.

3. An attachment for gang disk harrows and the like comprising a U-shaped frame, means for attaching the extremities of the frame to the frame of a gang of disks so that the U-shaped frame extends in a plane substantially parallel to the frame of the gang of disks, said U-shaped frame having bearings in the corners thereof, standards slidable through the bearings, wheels, means for journaling the wheels on the lower ends of the standards, sleeves fixed to the standards above the U-shaped frame, trunnions projecting from the sleeve, levers pivoted on the trunnions, notched segments projecting from the sleeve, spring pressed pawls on the lever engageable with the notched segments, links pivotally engaged on the levers engageable with the notched segments, links pivotally engaged with the levers and the U-shaped frame, a brace rod, means for attaching the forward ends of the rod to the frame of the gang of disks, the rear end of the brace rod having a cross rod terminating in sleeves to receive the upper ends of the standards.

4. An attachment for gang disk harrows and the like comprising a U-shaped frame, means for attaching the extremities of the frame to the frame of a gang of disks so that the U-shaped frame extends in a plane substantially parallel to the frame of the gang of disks, said U-shaped frame having bearings in the corners thereof, standards slidable through the bearings, wheels, means for journaling the wheels on the lower ends of the standards, sleeves fixed to the standards above the U-shaped frame, trunnions projecting from the sleeve, levers pivoted on the trunnions, notched segments projecting from the sleeve spring pressed pawls on the levers engageable with the notched segments, links pivotally engaged on the levers engageable with the notched segments, links pivotally engaged with the levers and the U-shaped frame, a brace rod, means for attaching the forward ends of the rod to the frame of the gang of disks, the rear end of the brace rod having a cross rod terminating in sleeves to receive the upper ends of the standards, each lever having its forward portion bifurcated and the bifurcations being bowed to extend around the sleeve, said trunnions piercing openings in the bowed portions of the bifurcations.

In testimony whereof I affix my signature.

JAMES A. HENNINGER.